US012570245B2

(12) United States Patent
Choi et al.

(10) Patent No.: US 12,570,245 B2
(45) Date of Patent: Mar. 10, 2026

(54) VEHICLE BATTERY ATTACHMENT/DETACHMENT DEVICE

(71) Applicant: HYUNDAI MOBIS CO., LTD., Seoul (KR)

(72) Inventors: Ik Keun Choi, Yongin-si (KR); Da Som Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 315 days.

(21) Appl. No.: 18/209,253

(22) Filed: Jun. 13, 2023

(65) Prior Publication Data

US 2024/0190394 A1 Jun. 13, 2024

(30) Foreign Application Priority Data

Dec. 13, 2022 (KR) ........................ 10-2022-0173709

(51) Int. Cl.
*B60S 5/06* (2019.01)
*H01M 50/244* (2021.01)
*H01M 50/249* (2021.01)

(52) U.S. Cl.
CPC ............. *B60S 5/06* (2013.01); *H01M 50/244* (2021.01); *H01M 50/249* (2021.01); *H01M 2220/20* (2013.01)

(58) Field of Classification Search
CPC ..... B60S 5/06; H01M 50/244; H01M 50/249; B62B 3/02; B62B 3/022; B62B 3/044; B60K 2001/0461; B60K 2001/0477; B60K 2001/0494
See application file for complete search history.

(56) References Cited

U.S. PATENT DOCUMENTS

| | | | | |
|---|---|---|---|---|
| 4,192,541 A | * | 3/1980 | Ferneau ............... | A61G 1/0262 280/640 |
| 4,808,058 A | * | 2/1989 | Carney .................... | B60K 1/04 414/349 |
| 5,360,307 A | * | 11/1994 | Schemm .................. | B62B 3/10 180/68.5 |
| 5,760,569 A | * | 6/1998 | Chase, Jr. ........... | H01M 50/204 414/281 |

(Continued)

FOREIGN PATENT DOCUMENTS

| | | |
|---|---|---|
| CN | 107697037 A | 2/2018 |
| CN | 109987062 A | 7/2019 |

(Continued)

OTHER PUBLICATIONS

Office Action issued in corresponding Korean Patent Application No. KR 10-2022-0173709 dated Jul. 22, 2024, with English translation.

(Continued)

*Primary Examiner* — Jeffrey J Restifo
(74) *Attorney, Agent, or Firm* — MORGAN, LEWIS & BOCKIUS LLP

(57) ABSTRACT

The vehicle battery attachment/detachment device includes a battery case that accommodates a battery therein and moves into a vehicle in a width direction of the vehicle, and a docking assembly that is rotatably coupled to the battery case and is folded to move into the vehicle together with the battery case or is unfolded to move the battery case to an outside of the vehicle.

14 Claims, 14 Drawing Sheets

(56) References Cited

U.S. PATENT DOCUMENTS

| | | | | |
|---|---|---|---|---|
| 6,045,150 | A * | 4/2000 | Al-Toukhi | B62B 3/027 248/676 |
| 6,070,899 | A * | 6/2000 | Gines | B62B 5/0003 280/655 |
| 6,575,491 | B2 * | 6/2003 | Miller | B62B 5/0003 280/638 |
| 6,976,696 | B2 * | 12/2005 | O'Krangley | A61G 1/0562 280/638 |
| 7,080,844 | B2 * | 7/2006 | Espejo | B62B 5/0003 280/33.996 |
| 7,712,563 | B2 * | 5/2010 | Niebuhr | B60L 53/80 180/311 |
| 8,172,256 | B2 * | 5/2012 | Fine | B62B 5/0003 280/638 |
| 8,408,581 | B1 * | 4/2013 | Hunter | B62B 3/027 280/33.993 |
| 8,500,094 | B2 * | 8/2013 | Haslberger | B66F 9/0754 180/68.5 |
| 8,540,273 | B2 * | 9/2013 | Dobrachinski | B62B 3/02 280/651 |
| 8,979,115 | B1 * | 3/2015 | Baron | B62B 3/106 280/DIG. 4 |
| 9,126,610 | B1 * | 9/2015 | Abiri | B62B 3/027 |
| 9,211,899 | B2 * | 12/2015 | Beauchamp | B62B 3/027 |
| 9,221,486 | B2 * | 12/2015 | Fine | B62B 3/027 |
| 10,106,182 | B2 * | 10/2018 | Camarco | B62B 5/0003 |
| 10,131,373 | B1 * | 11/2018 | Ness | B62B 5/0003 |
| 10,183,563 | B2 * | 1/2019 | Rayner | B62K 27/06 |
| 10,633,011 | B2 * | 4/2020 | Matsumoto | B62B 5/00 |
| 10,875,561 | B1 * | 12/2020 | Marker | B62B 3/04 |
| 11,014,593 | B2 * | 5/2021 | Knepp | B62D 61/04 |
| 11,420,319 | B2 * | 8/2022 | Peterson | F16M 11/2092 |
| 11,447,167 | B2 * | 9/2022 | O'Donnell | B62B 5/0003 |
| 11,489,226 | B2 * | 11/2022 | Yamada | B60L 53/80 |
| 11,970,103 | B2 * | 4/2024 | Basu | B60R 11/00 |
| 12,122,332 | B2 * | 10/2024 | Georgeson | B60W 60/00256 |
| 12,128,858 | B2 * | 10/2024 | Smock | B60S 5/06 |
| 2006/0078409 | A1 * | 4/2006 | Takeda | B62B 3/04 198/300 |
| 2008/0303248 | A1 * | 12/2008 | Chaparro | B62B 5/0003 280/651 |
| 2010/0147604 | A1 * | 6/2010 | Sakita | B60R 16/04 180/68.5 |
| 2018/0290679 | A1 * | 10/2018 | Arai | B62B 3/02 |
| 2023/0271640 | A1 * | 8/2023 | Lauderbaugh | B66F 7/08 254/7 C |
| 2024/0068177 | A1 * | 2/2024 | Tokubi | E01C 19/262 |
| 2024/0190394 | A1 * | 6/2024 | Choi | H01M 50/249 |
| 2024/0383367 | A1 * | 11/2024 | Vladimerou | B60L 53/80 |
| 2025/0136162 | A1 * | 5/2025 | Newkirk | B62B 3/04 |
| 2025/0162488 | A1 * | 5/2025 | Wise | B60P 7/0815 |

FOREIGN PATENT DOCUMENTS

| | | |
|---|---|---|
| JP | H02-216320 A | 8/1990 |
| JP | 2011-152906 A | 8/2011 |

OTHER PUBLICATIONS

Office Action issued in corresponding German Patent Application No. DE 102023117376.6 dated Nov. 12, 2025, with English translation.

* cited by examiner

【FIG. 1】
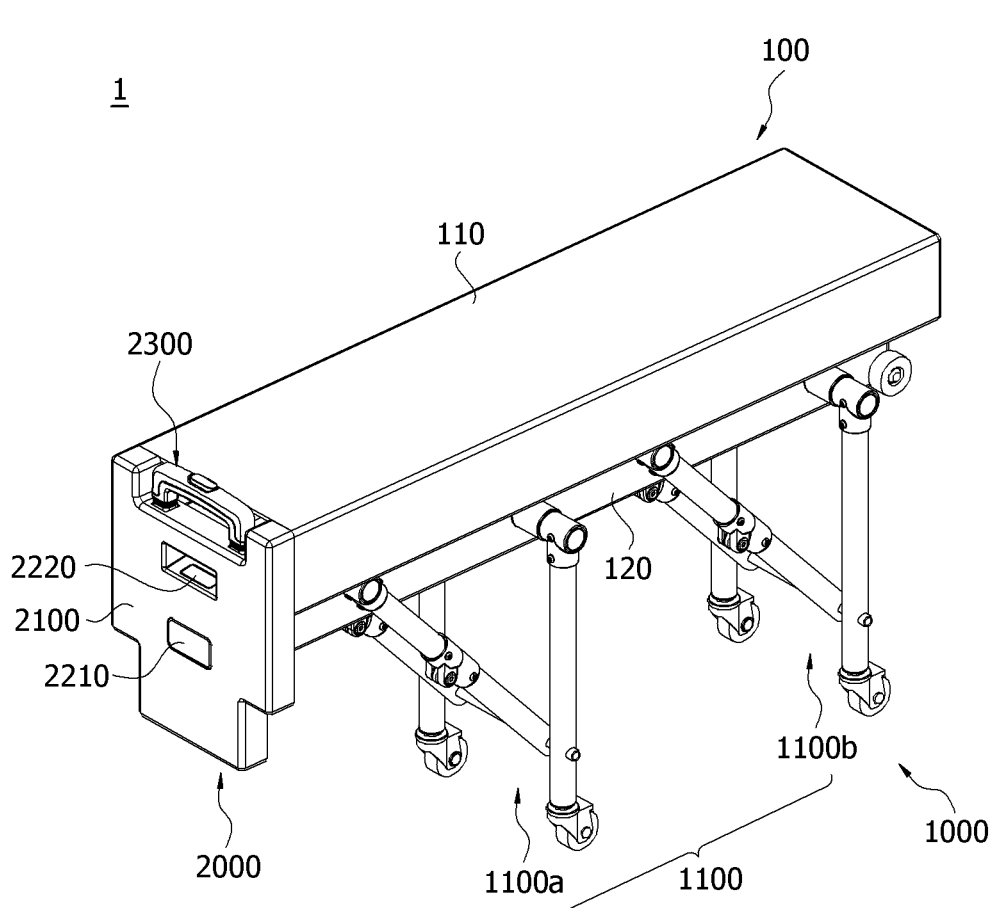

【FIG. 2】
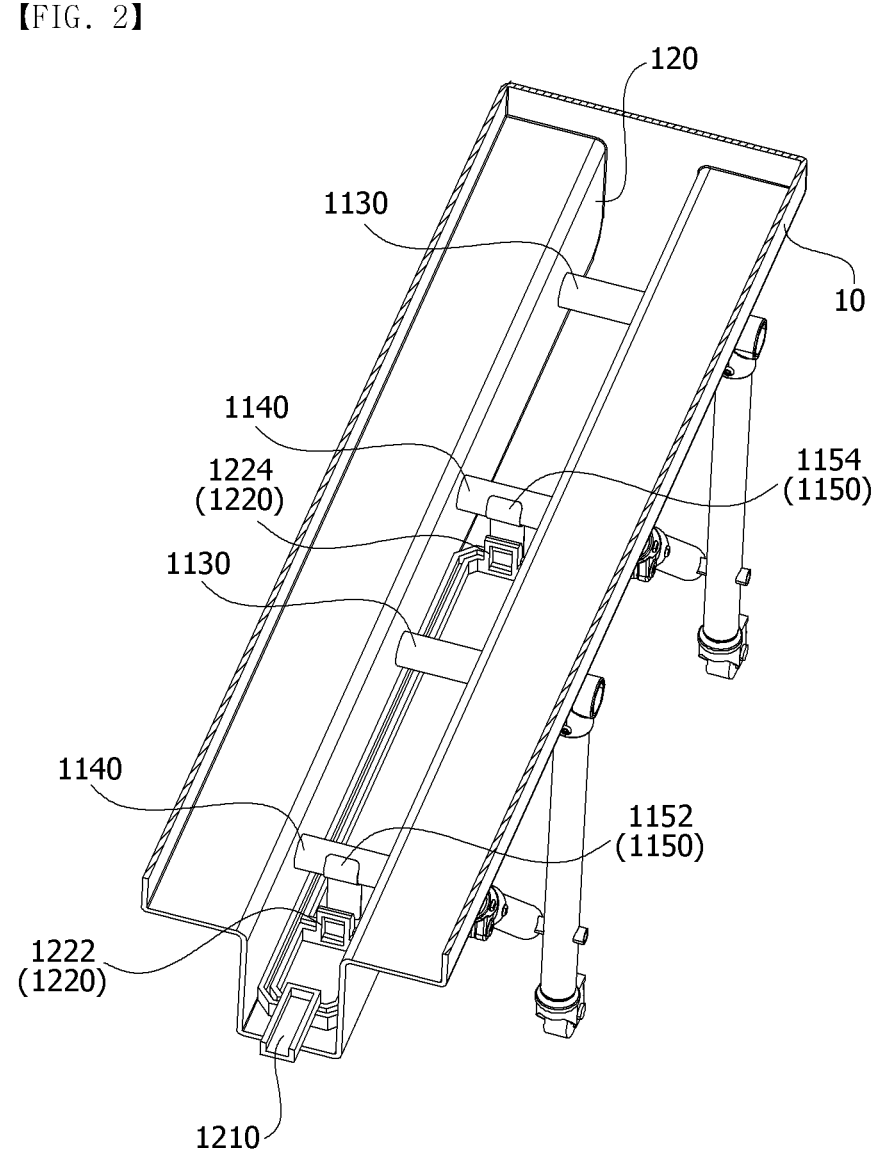

【FIG. 3】
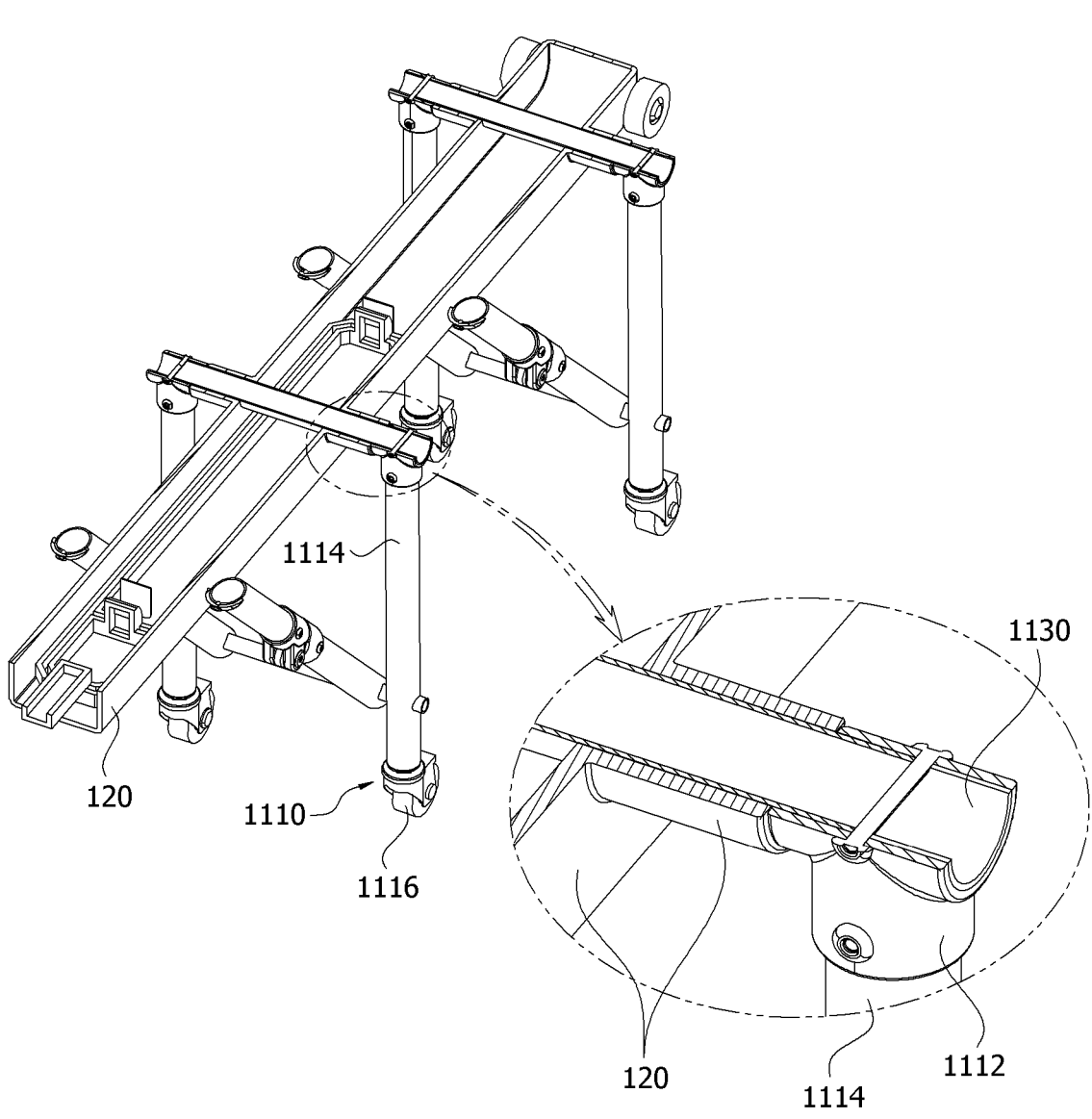

【FIG. 4】
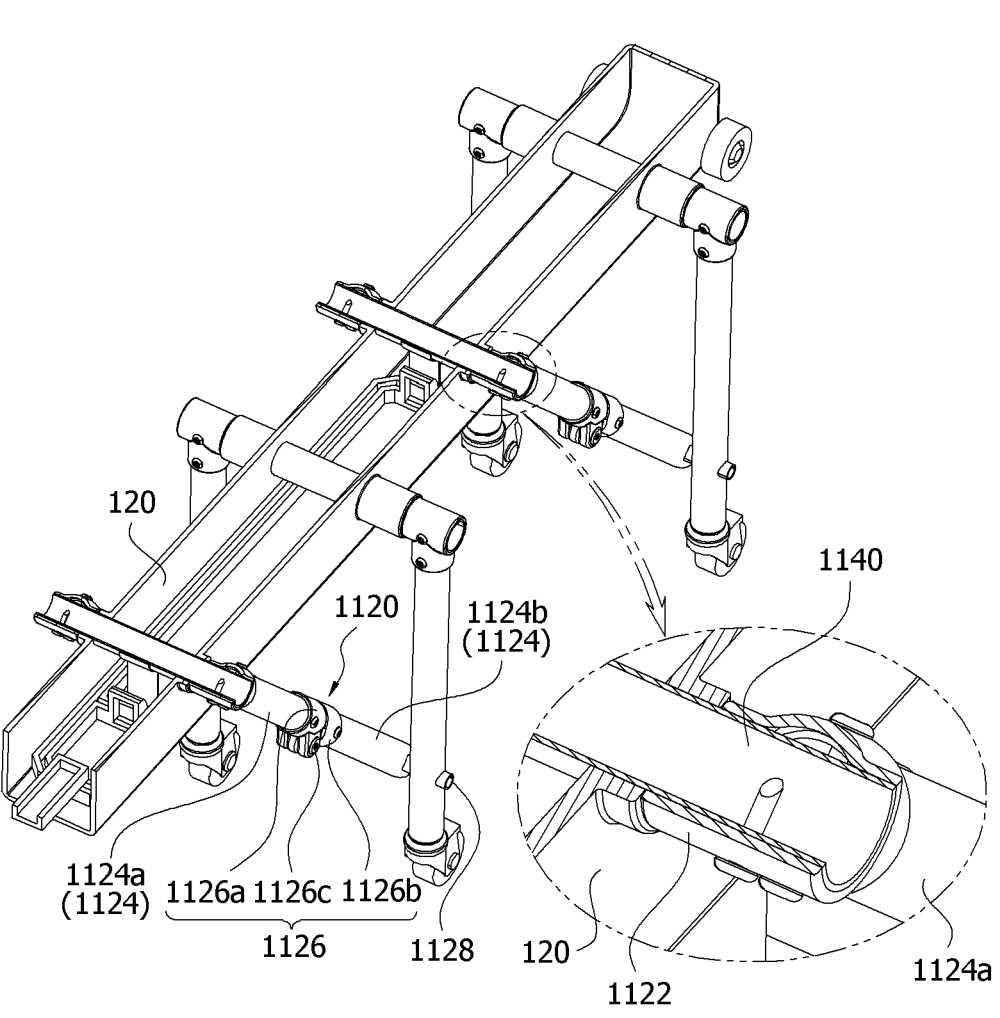

【FIG. 5】
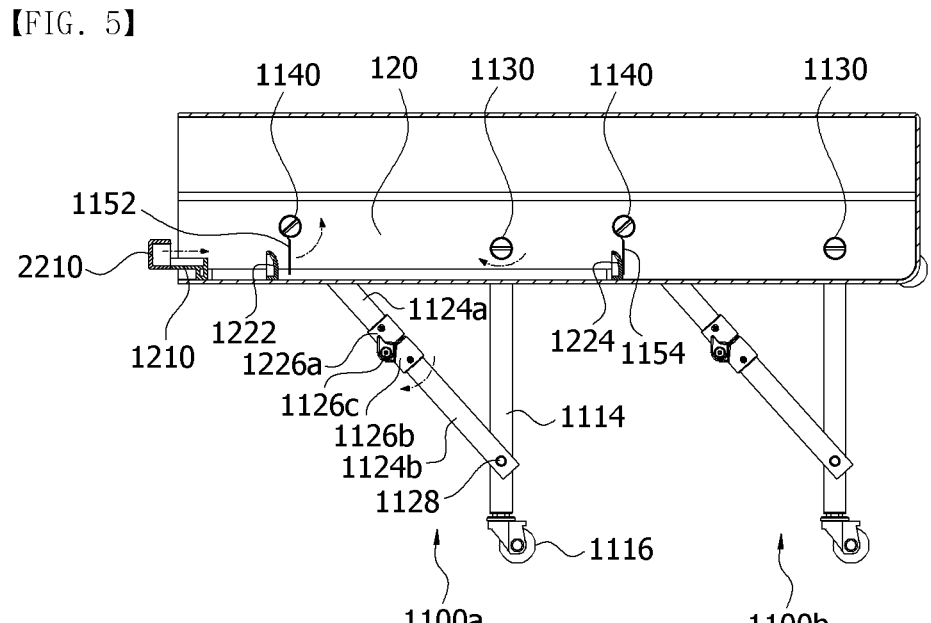

【FIG. 6】
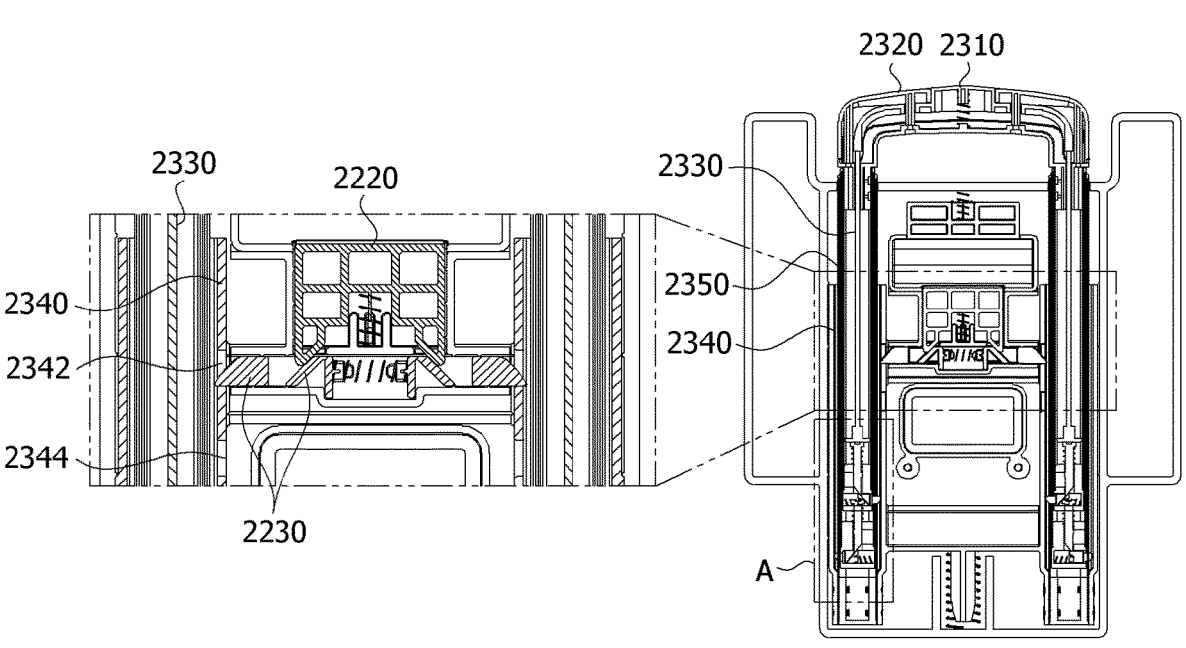

【FIG. 7】
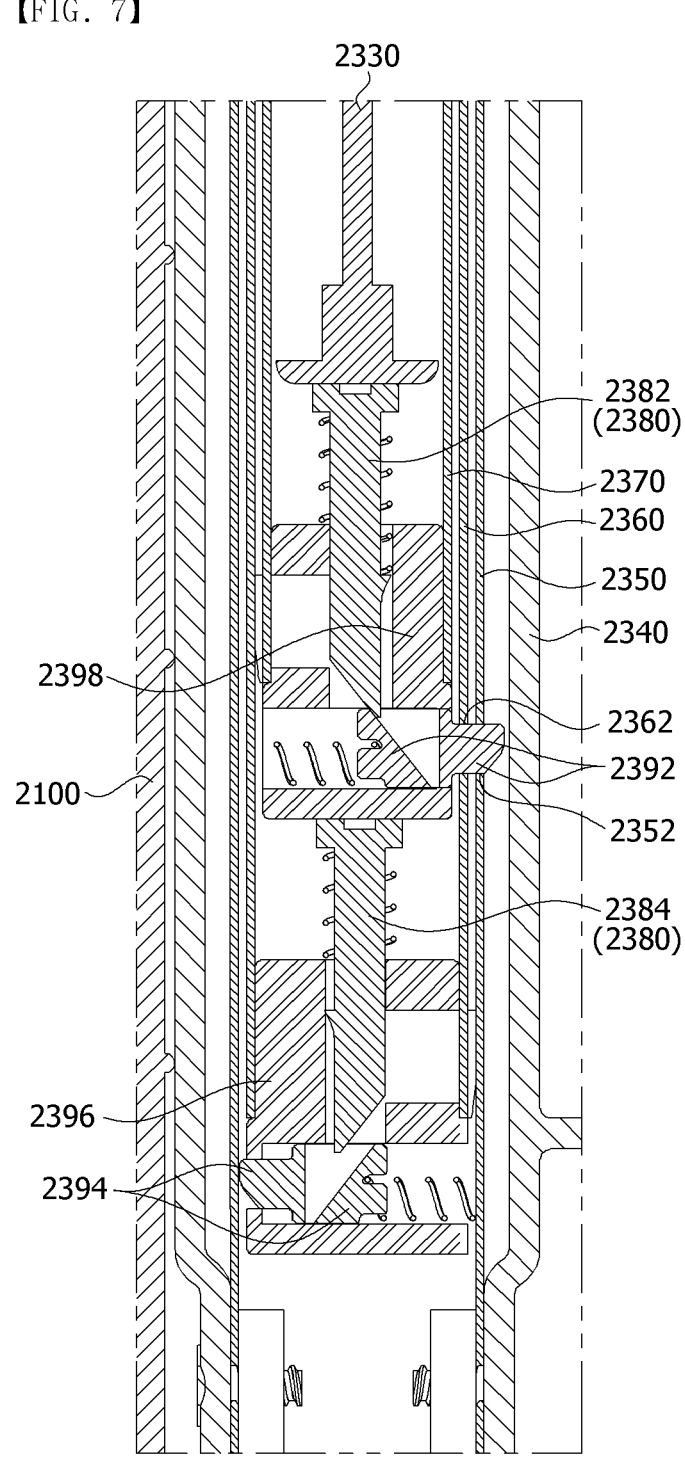

【FIG. 8】
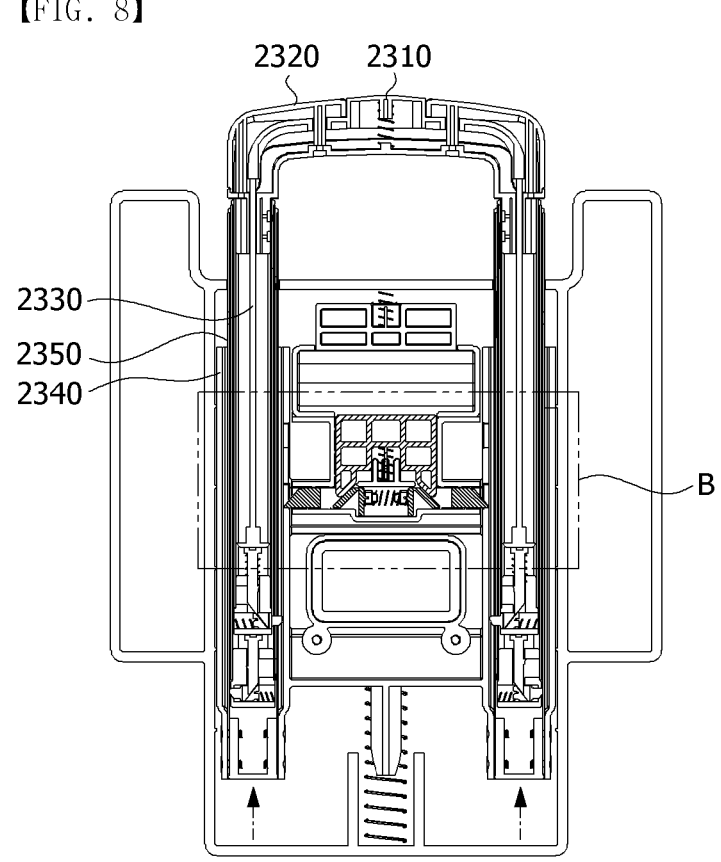

【FIG. 9】
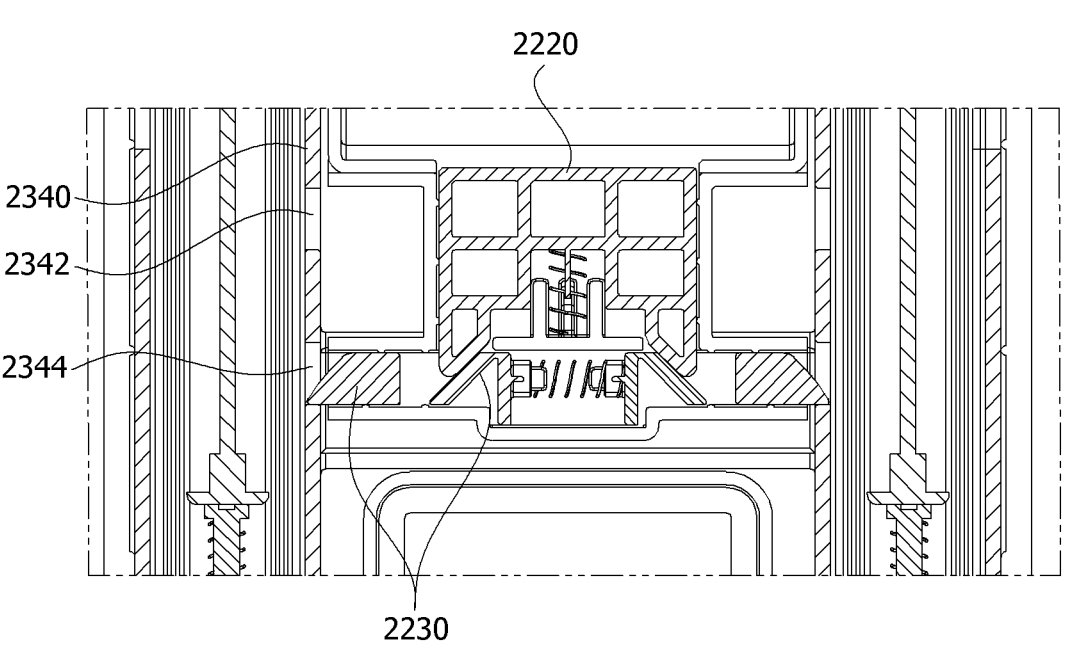

【FIG. 10】
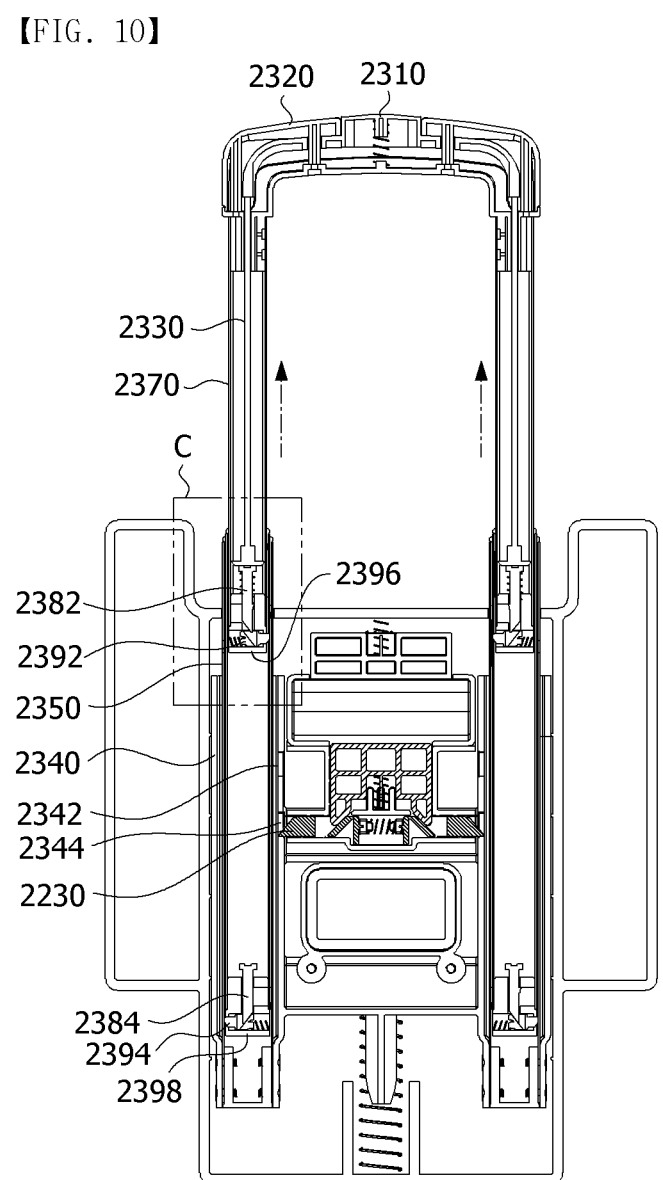

【FIG. 11】
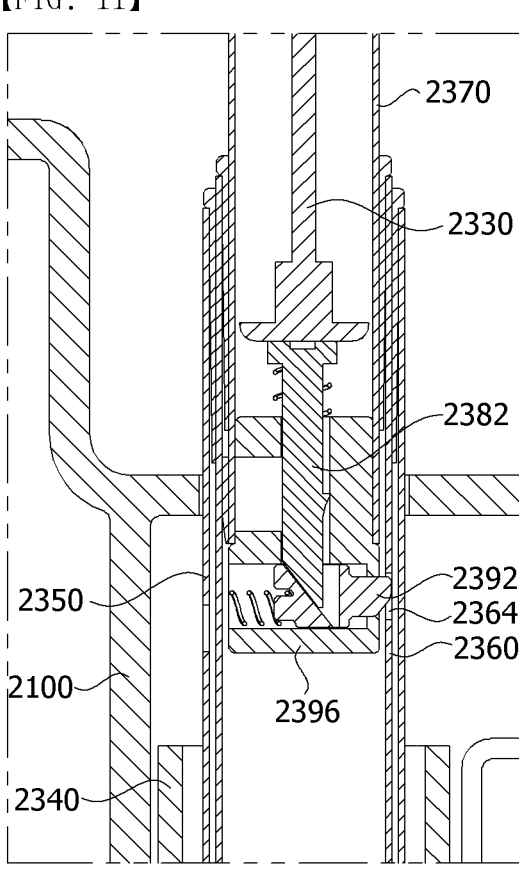

【FIG. 12】
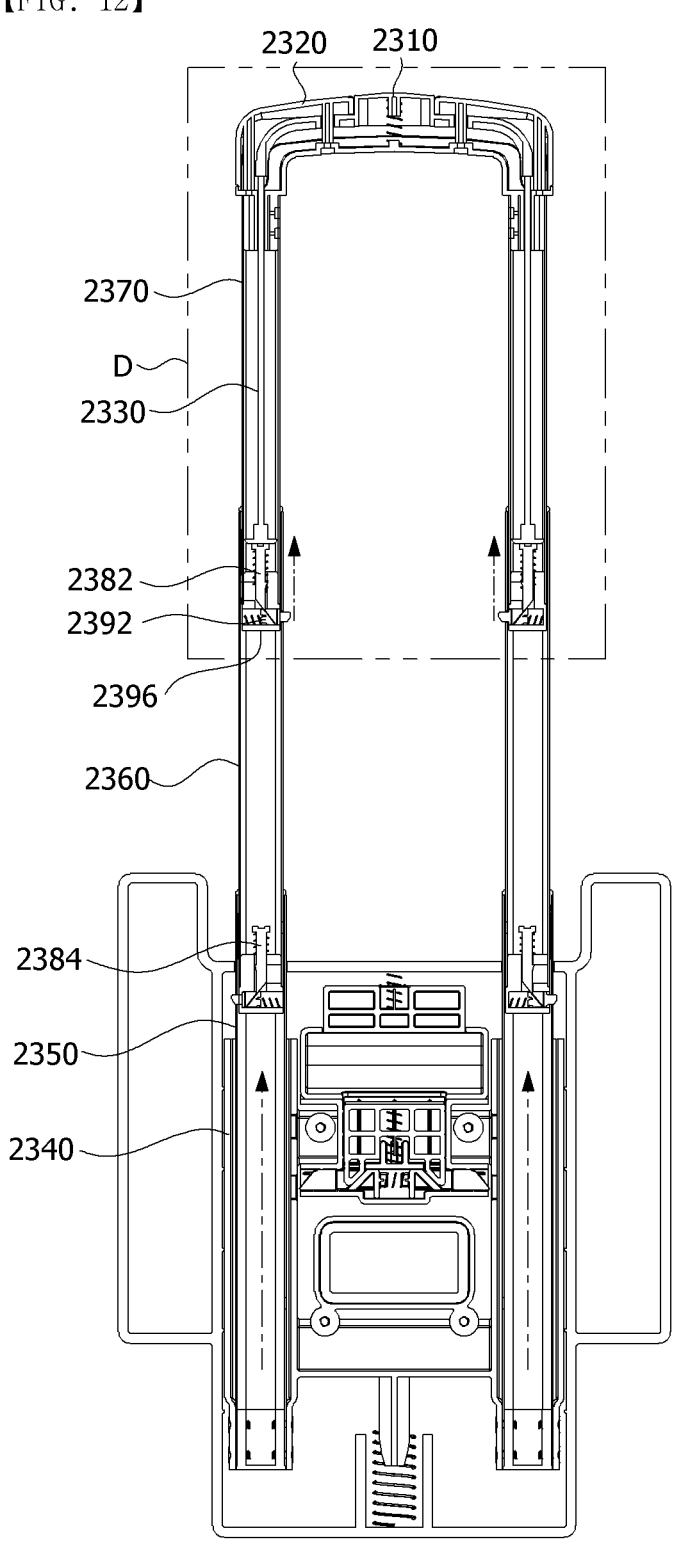

【FIG. 13】
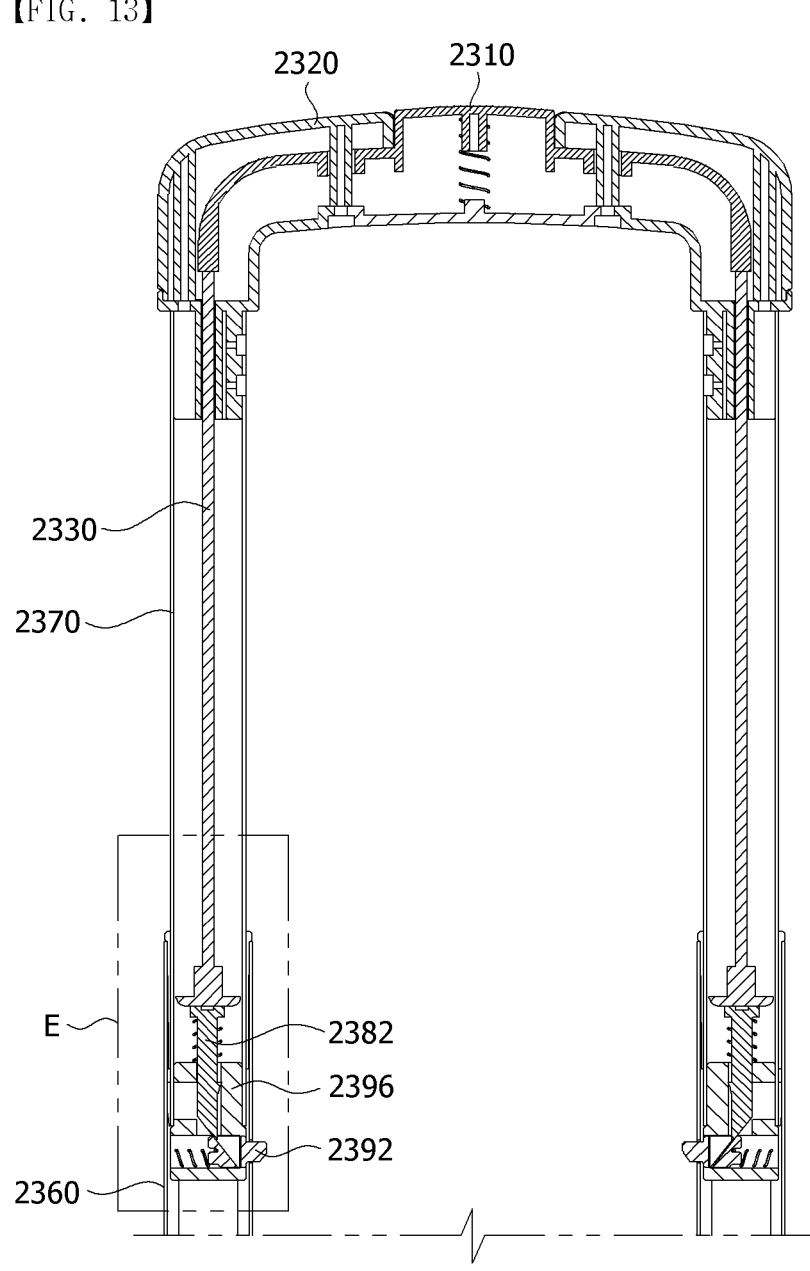

【FIG. 14】
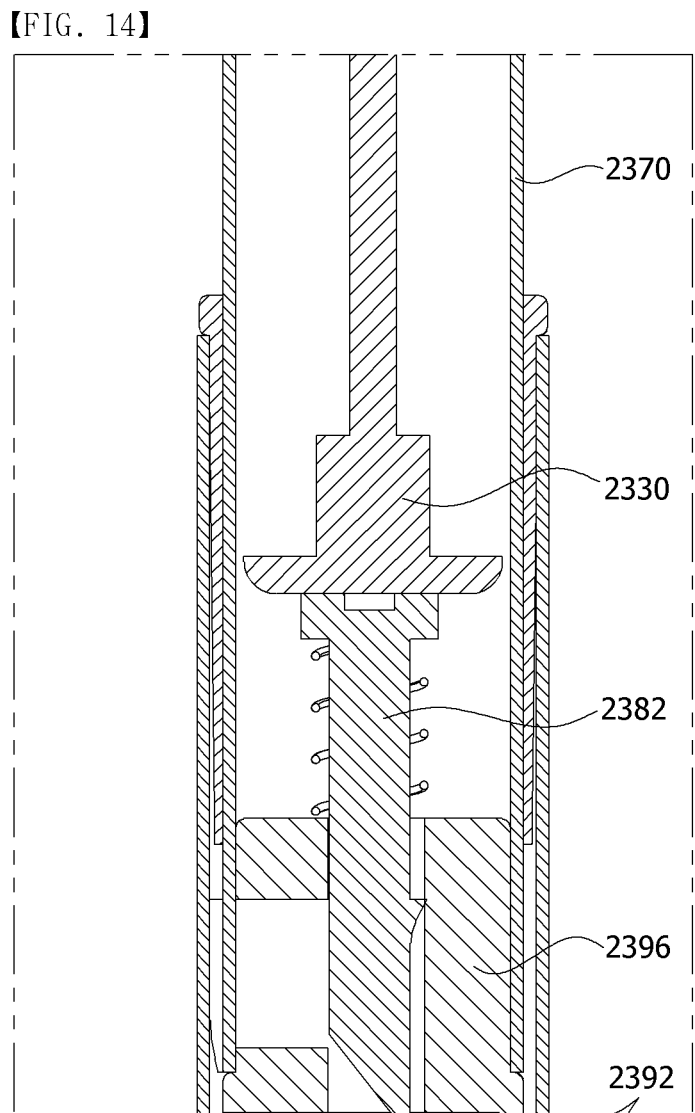

VEHICLE BATTERY ATTACHMENT/DETACHMENT DEVICE

CROSS-REFERENCE TO RELATED APPLICATION

This application claims priority to and the benefit of Korean Patent Application No. 10-2022-0173709 filed on Dec. 13, 2022, the disclosure of which is incorporated herein by reference in its entirety.

BACKGROUND

1. Field of the Invention

The present disclosure relates to a vehicle battery attachment/detachment device.

2. Discussion of Related Art

Pickup trucks are a type of small truck without a luggage compartment cover, and pickup trucks have various spaces for loading a lot of luggage.

Among them, a side storage space called a gear tunnel is formed behind a cabin that is a boarding space. The side storage space has a tunnel shape in a width direction of the pickup truck and can accommodate various items.

Further, the side storage space is also called a battery cell, and when the side storage space is used as a battery cell, a battery is stored in the side storage space through a battery attachment/detachment device.

The battery attachment/detachment device for accommodating a battery may include a battery housing, a head cover that covers one side of the battery housing, a leg rotatably coupled to the battery housing and configured to roll on the ground or a bottom surface of an object, and a leveling guide that supports the battery housing while in contact with the ground or a bottom surface of the object or maintains a horizontal state of the battery housing.

However, in a battery attachment/detachment device according to the related art, since a leg and a guide should be manually folded, the time to enter the side storage space is extended.

Further, in the battery attachment/detachment device according to the related art, since only one leg is disposed at a side portion of a battery housing opposite to a side portion thereof to which a head cover is coupled, a battery case unstably moves, and thus a probability that the battery case is damaged increases.

SUMMARY OF THE INVENTION

The present disclosure is directed to providing an improved vehicle battery attachment/detachment device in which a battery can be easily and stably inserted into and retracted from a side storage space of a pickup truck.

A vehicle battery attachment/detachment device includes a battery case that accommodates a battery therein and moves into a vehicle in a width direction of the vehicle, and a docking assembly that is rotatably coupled to the battery case and is folded to move into the vehicle together with the battery case or is unfolded to move the battery case to an outside of the vehicle.

The vehicle battery attachment/detachment device may include a handle assembly coupled to the battery case, wherein the handle assembly includes a docking button that is connected to the docking assembly and pushes the docking assembly so that the docking assembly rotates, and the docking assembly includes docking units arranged on both sides of the battery case, and a push block that is connected to the docking button and pushes the docking units so that the docking units rotate in conjunction with movement of the docking button.

The docking units may include a first docking unit disposed at an end of the battery case, which is coupled to the handle assembly, in a lengthwise direction of the battery case, and a second docking unit disposed at an end of the battery case, which is not coupled to the handle assembly, and when the docking button of the handle assembly pushes the push block of the docking assembly, a first leg may be folded after a second leg is folded.

The docking unit may include the first legs arranged on both sides of the battery case, the second legs arranged on both sides of the battery case and arranged inclined with respect to the first leg to overlap one region of the first legs, a first connector rotatably coupled to the battery case, protruding from an inside to an outside of the battery case, and coupled to the first legs, a second connector rotatably coupled to the battery case, protruding from the inside to the outside of the battery case, and coupled to the second legs, and a rotation block connected to the second connector and pressed and rotated by the push block of the handle assembly.

The rotation block may include a first rotation block coupled to the second connector of the first docking unit, and a second rotation block coupled to the second connector of the second docking unit.

The push block of the docking assembly may include a movement frame connected to the docking button of the handle assembly and having a space formed therein, and a pressing frame that is disposed inside the movement frame and rotates the first rotation block and the second rotation block.

The pressing frame may include a first pressing frame that presses the first rotation block, and a second pressing frame that presses the second rotation block.

In a state before the docking button of the handle assembly presses the movement frame of the push block, the first pressing frame may be maintained in a state spaced apart from the first rotation block, and the second pressing frame may be maintained in a state in contact with the second rotation block.

When the docking button of the handle assembly presses the movement frame of the push block, after the second rotation block starts to rotate by the second pressing frame, the first pressing frame may come into contact with the first rotation block.

The handle assembly may include a cover case that is coupled to the battery case and covers an opening of the battery case, a handle unit that is disposed on the cover case to be movable inside and outside the cover case and is of a telescopic type that is stretched in a direction different from the movement direction of the battery case, and a button unit that is coupled to the cover case and activates or restricts movement of the handle unit.

The button unit may include an unlock button that is movable in the movement direction of the handle unit, and a first lock block connected to the unlock button to move in conjunction with the movement of the unlock button.

The handle unit may include a first transport frame that is connected to the first lock block of the button unit and is movable in a direction different from the movement direction of the first lock block inside the cover case by the movement of the first lock block, and the first transport frame may include at least one position fixing hole connected to the first lock block while moving in a direction different from the movement direction of the first lock block.

The handle unit may include a pressing button that is disposed outside the battery case and is movable in the same direction as the unlock button, and a rod that is connected to the pressing button, is pressed by the pressing button, and is movable in the same direction as a direction in which the pressing button presses.

The handle unit may include a second transport frame that is coupled to the first transport frame and protrudes outward from the cover case, a first protrusion frame movably disposed inside the second transport frame, a second protrusion frame movably disposed inside the first protrusion frame, and a second lock block passing through the second transport frame and the first protrusion frame to restrict movement of the second transport frame and the first protrusion frame.

The handle unit may include a pin block connected to the rod and pressed by the rod and connected to the second lock block to move the second lock block by a pressing force generated in the rod.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 1 is a perspective view of a vehicle battery attachment/detachment device according to an embodiment of the present disclosure;

FIG. 2 is a perspective view illustrating a cross section of a portion of a first accommodation part of a battery case;

FIG. 3 is a view illustrating a cross section of a first connector;

FIG. 4 is a view illustrating a cross section of a second connector;

FIG. 5 is a view illustrating an arrangement state between a rotation block and a pressing frame of a push block;

FIG. 6 is a cross-sectional view illustrating an initial state of a handle assembly;

FIG. 7 is an enlarged view of part A of FIG. 6;

FIG. 8 is a cross-sectional view illustrating a state in which a first lock block is moved by a first unlock button;

FIG. 9 is an enlarged view of part B of FIG. 8;

FIG. 10 is a cross-sectional view illustrating a state in which a first protrusion frame protrudes outward from a cover case;

FIG. 11 is an enlarged view of part C of FIG. 10;

FIG. 12 is a cross-sectional view illustrating a state in which a second protrusion frame protrudes outward from the first protrusion frame;

FIG. 13 is an enlarged view of part D of FIG. 12; and

FIG. 14 is an enlarged view of part E of FIG. 13.

DETAILED DESCRIPTION OF EXEMPLARY EMBODIMENTS

The present disclosure may be modified in various changes and may have various embodiments and is thus intended to describe specific embodiments with the accompanying drawings. However, it should be understood that the present disclosure is not limited to the specific embodiments and includes all changes, equivalents, and substitutions included in the spirit and scope of the present disclosure.

Terms including ordinal numbers such as first and second may be used to describe various components, but the components are not limited by the terms. The terms are used only for the purpose of distinguishing one component from another component. For example, without departing from the scope of the present disclosure, a second component may be referred to as a first component, and similarly, the first component may be referred to as the second component. Term "and/or" includes any or a combination of a plurality of related listed items.

It should be understood that, when it is referenced that a first component is "connected" or "coupled" to a second component, the first component may be directly connected or coupled to the second component, or a third component may be present between the first component and the second component. On the other hand, it should be understood that, when a first component is "directly connected" or "directly coupled" to a second component, a third component is not present therebetween.

In the description of the embodiment, a case in which it is described that a first component is formed "on or under" a second component includes both a case in which the two components are in direct contact with each other and a case in which one or more other components are arranged between the two components. Further, when the term "on or under" is expressed, the term "on or under" may include the meanings of a downward direction as well as an upward direction based on one component.

Terms used in the present application are used only to describe the specific embodiments and are not intended to limit the present disclosure. Singular expressions include plural expressions unless clearly otherwise indicated in the context. It should be understood in the present application that terms such as "include" or "have" are intended to indicate that there are features, numbers, steps, operations, components, parts, or combinations thereof that are described in the specification and do not exclude in advance the possibility of the presence or addition of one or more other features, numbers, steps, operations, components, parts, or combinations thereof.

Unless otherwise defined, all terms used herein including technical or scientific terms have the same meanings as those commonly understood by those skilled in the art to which the present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a vehicle battery attachment/detachment device will be described in detail with reference to the accompanying drawings, the same or corresponding components are designated by the same reference numerals regardless of the reference numerals, and the duplicated description thereof will be omitted.

FIG. 1 is a perspective view of a vehicle battery attachment/detachment device according to an embodiment of the present disclosure, FIG. 2 is a perspective view illustrating a cross section of a portion of a first accommodation part of a battery case, FIG. 3 is a view illustrating a cross section of a first connector, FIG. 4 is a view illustrating a cross section of a second connector, and FIG. 5 is a view illustrating an arrangement state between a rotation block and a pressing frame of a push block.

Referring to FIGS. 1 to 5, a vehicle battery attachment/detachment device 1 according to an embodiment of the present disclosure includes a battery case 100 in which a battery (not illustrated) is accommodated and which may move into a vehicle in a width direction of the vehicle, a docking assembly 1000 that is rotatably coupled to the battery case 100 and is folded to move into a vehicle together with the battery case 100 or unfolded so that the battery case 100 may move to the outside of the vehicle, and a handle assembly 2000 that is coupled to the battery case 100 and enables movement of the docking assembly 1000. In the present embodiment, a width direction may mean a direction from a driver's seat to a passenger's seat or from the passenger's seat to the driver's seat of the vehicle (not illustrated), and a lengthwise direction may mean a direction crossing the width direction or a direction from a driving room to a trunk or the trunk to the driving room.

The battery case 100 may be provided in a shape of which a length is elongated in the width direction of the vehicle. The battery case 100 may include a first accommodation part 110 and a second accommodation part 120.

The first accommodation part 110 may accommodate a battery therein. The first accommodation part 110 may have a shape corresponding to an exterior of a battery. Thus, even in vibration caused by an external force, the battery may be maintained in a state of being disposed inside the first accommodation part 110 in a state in which shaking is reduced.

The second accommodation part 120 may have a shape protruding from the first accommodation part 110. The second accommodation part 120 may have a width that is smaller than a width of the first accommodation part 110. As illustrated in FIG. 2, the second accommodation part 120 may accommodate therein a first connector 1130, a second connector 1140, a rotation block 1150, and a push block 1200, which will be described below. Further, since a docking unit 1100, which will be described below, is disposed outside the second accommodation part 120, the second accommodation part 120 may move from an outside to an inside of the vehicle or from the inside to the outside of the vehicle by movement of the docking unit 1100.

The docking assembly 1000 is coupled to the battery case 100 and may move the battery case 100 forward or rearward in the same direction as the width direction of the vehicle. The docking assembly 1000 may include the docking unit 1100 and the push block 1200.

The docking units 1100 may be arranged on both sides of the battery case 100. In more detail, the docking units 1100 may be arranged outside the second accommodation part 120 of the battery case 100. The docking units 1100 may include a first docking unit 1100a disposed at an end of the battery case 100, which is coupled to the handle assembly 2000, in a lengthwise direction of the battery case 100, and a second docking unit 1100b disposed at an end of the battery case 100, which is not coupled to the handle assembly 2000. As described above, the first docking unit 1100a and the second docking unit 1100b may be a combination of the same configurations only with a difference in an arrangement position. Thus, configurations of the docking unit 1100, which will be described below, are configurations applied to the first docking unit 1100a and the second docking unit 1100b.

The docking unit 1100 may include a first leg 1110, a second leg 1120, the first connector 1130, the second connector 1140, and the rotation block 1150.

As illustrated in FIG. 3, the first legs 11110 may be arranged on both sides of the battery case 100. In more detail, the first leg 1110 may be coupled to the second accommodation part 120 of the battery case 100. The first leg 1110 may include a first socket 1112, a first leg frame 1114, and a caster 1116.

The first socket 1112 may be coupled to the second accommodation part 120 of the battery case 100. The first socket 1112 may be connected to the first connector 1130 while coupled to the second accommodation part 120. The first socket 1112 may rotate in conjunction with rotation of the first connector 1130.

The first leg frame 1114 may be coupled to the first socket 1112. The first leg frame 1114 may be disposed in a direction perpendicular to the battery case 100 while coupled to the first socket 1112.

The caster 1116 may be coupled to the first leg frame 1114. The caster 1116 may come into contact with the ground or a bottom surface of an object when the first leg 1110 is unfolded. The caster 1116 may help movement of the battery case 100 while rotating when the battery case 100 is moved.

As illustrated in FIG. 4, the second legs 1120 may be arranged on both sides of the battery case 100. In more detail, the second leg 1120 may be coupled to the second accommodation part 120 of the battery case 100. The second leg 1120 may be disposed inclined with respect to the first leg 1110 to overlap one region of the first leg 1110. The second leg 1120 may include a second socket 1122, a second leg frame 1124, a third socket 1126, and a coupling member 1128.

The second socket 1122 may be coupled to the second accommodation part 120 of the battery case 100. The second socket 1122 may be connected to the second connector 1140 while coupled to the second accommodation part 120. The second socket 1122 may rotate in conjunction with rotation of the second connector 1140.

The second leg frame 1124 may be coupled to the second socket 1122. The second leg frame 1124 may be disposed in a direction toward an end of the first leg frame 1114, which is coupled to the caster 1116, while coupled to the second socket 1122. The second leg frame 1124 may include a (2-1)$^{th}$ leg frame 1124a coupled to the second socket 1122 and a (2-2)$^{th}$ leg frame 1124b disposed in the same direction as a direction in which the (2-1)$^{th}$ leg frame 1124a is disposed and having an end portion overlapping one region of the first leg frame 1114.

The third socket 1126 may connect the (2-1)$^{th}$ leg frame 1124a and the (2-2)$^{th}$ leg frame 1124b. The third socket 1126 may include a (3-1)$^{th}$ socket 1126a connected to the (2-1)$^{th}$ leg frame 1124a, a (3-2)$^{th}$ socket 1126b connected to the (2-2)$^{th}$ leg frame 1124b, and a rotary shaft 1126c connecting the (3-1)$^{th}$ socket 1126a and the (3-2)$^{th}$ socket 1126b and serving as a rotation center of the (3-1)$^{th}$ socket 1126a and (3-2)$^{th}$ socket 1126b. The (3-1)$^{th}$ socket 1126a and the (3-2)$^{th}$ socket 1126b may rotate about the rotary shaft 1126c.

The coupling member 1128 may be a pin-shaped member. The coupling member 1128 may connect the first leg frame 1114 and the (2-2)$^{th}$ leg frame 1124b. When the (2-2)$^{th}$ leg frame 1124b rotates about the rotary shaft 1126c of the third socket 1126, the first leg frame 1114 may rotate in the same direction as a direction in which the (2-2)$^{th}$ leg frame 1124b rotates about the first connector 1130 by the coupling member 1128 connected to the (2-2)$^{th}$ leg frame 1124b.

As illustrated in FIG. 3, the first connector 1130 may be rotatably coupled to the battery case 100. The first connector 1130 may protrude from an inside to an outside of the battery case 100 while disposed inside the second accommodation part 120 of the battery case 100. The first connector 1130 may be coupled to the first socket 1112 of the first leg 1110 and serve as a rotational center of the first socket 1112. The first connector 1130 may be provided as a cylindrical pipe having an empty inside, but the present disclosure is not limited thereto.

As illustrated in FIG. 4, the second connector 1140 may be rotatably coupled to the battery case 100. The second connector 1140 may protrude from the inside to the outside of the battery case 100 while disposed inside the second accommodation part 120 of the battery case 100. The second connector 1140 may be coupled to the second socket 1122 of the second leg 1120 and serve as a rotational center of the second socket 1122. The second connector 1140 may be provided as a cylindrical pipe having an empty inside, but the present disclosure is not limited thereto.

The rotation block 1150 may be coupled to the second connector 1140. The rotation block 1150 may be rotated by being pressed by the push block 1200, which will be described below, of the handle assembly 2000. The rotation block 1150 may include a first rotation block 1152 and a second rotation block 1154. The first rotation block 1152 may be coupled to the second connector 1140 of the first docking unit 1100*a*. The second rotation block 1154 may be coupled to the second connector 1140 of the second docking unit 1100*b*. When the rotation block 1150 rotates, the second connector 1140 connected to the rotation block 1150 rotates, and the second socket 1122 coupled to the second connector 1140 may rotate together with the second connector 1140 in the same direction as a direction in which the second connector 1140 rotates.

The push block 1200 may be connected to a docking button 2210, which will be described below, of the handle assembly 2000. The push block 1200 may push the docking unit 1100 so that the docking unit 1100 rotates in conjunction with movement of the docking button 2210. The push block 1200 may include a movement frame 1210 and a pressing frame 1220.

The movement frame 1210 may be connected to the docking button 2210, which will be described below, of the handle assembly 2000. The movement frame 1210 may move in conjunction with the movement of the docking button 2210. The movement frame 1210 may have a shape having a space therein.

The pressing frame 1220 may be disposed inside the movement frame 1210. The pressing frame 1220 may press the first rotation block 1152 and the second rotation block 1154. When the pressing frame 1220 presses the first rotation block 1152 and the second rotation block 1154, the first rotation block 1152 may rotate about a rotational center of the first rotation block 1152, and the second rotation block 1154 may rotate about a rotational center of the second rotation block 1154. The pressing frame 1220 may include a first pressing frame 1222 and a second pressing frame 1224. The first pressing frame 1222 may press the first rotation block 1152. The second pressing frame 1224 may press the second rotation block 1154. The second pressing frame 1224 may be disposed spaced apart from the first pressing frame 1222 in a lengthwise direction of the movement frame 1210.

Hereinafter, a process of folding the first docking unit 1100*a* and the second docking unit 1100*b* through the docking assembly 1000 will be described.

As illustrated in FIG. 5, in a state before the docking button 2210 of the handle assembly 2000 presses the movement frame 1210 of the push block 1200, the first pressing frame 1222 may be maintained in a state spaced apart from the first rotation block 1152, and the second pressing frame 1224 may be maintained in a state in contact with the second rotation block 1154. In this state, when the docking button 2210 of the handle assembly 2000 presses the movement frame 1210 of the push block 1200, after the second rotation block 1154 starts to rotate by the second pressing frame 1224, the first pressing frame 1222 may come into contact with the first rotation block 1152.

Hereinafter, a process in which the second rotation block 1154 starts to rotate by the second pressing frame 1224 and thus the second docking unit 1100*b* is folded will be described.

When the second pressing frame 1224 presses the second rotation block 1154 of the second docking unit 1100*b* and thus the second rotation block 1154 rotates, the second leg 1120 of the second docking unit 1100*b* may be folded. In more detail, when the second rotation block 1154 rotates, the second connector 1140 and the second socket 1122 together with the second rotation block 1154 rotate about a rotational center of the second connector 1140. When the second socket 1122 rotates, the $(2\text{-}1)^{th}$ leg frame 1124*a* and the $(3\text{-}1)^{th}$ socket 1126*a* rotate together with the second socket 1122. In this case, the $(3\text{-}2)^{th}$ socket 1126*b* may rotate about the rotary shaft 1126*c* in a direction opposite to a rotational direction of the $(3\text{-}1)^{th}$ socket 1126*a*. On the basis of FIG. 5, the $(3\text{-}1)^{th}$ socket 1126*a* rotates in a counterclockwise direction, and the $(3\text{-}2)^{th}$ socket 1126*b* rotates in a clockwise direction.

When the $(3\text{-}2)^{th}$ socket 1126*b* rotates in a clockwise direction, the $(2\text{-}2)^{th}$ leg frame 1124*b* connected to the $(3\text{-}2)^{th}$ socket 1126*b* rotates about the rotary shaft 1126*c* of the third socket 1126 in the same direction as a direction in which the $(3\text{-}2)^{th}$ socket 1126*b* rotates. When the $(2\text{-}2)^{th}$ leg frame 1124*b* rotates in a clockwise direction, the first leg frame 1114 connected to the $(2\text{-}2)^{th}$ leg frame 1124*b* through the coupling member 1128 may rotate along the $(2\text{-}2)^{th}$ leg frame 1124*b* in a clockwise direction. In this case, the first leg frame 1114, together with the first socket 1112 and the first connector 1130, may rotate about a rotational center of the first connector 1130.

When the first leg frame 1114 rotates along the $(2\text{-}2)^{th}$ leg frame 1124*b* in a clockwise direction, the caster 1116 also rotates in the same direction as a direction in which the first leg frame 1114 rotates. Accordingly, the second docking unit 1100*b* may rotate away from the ground or the bottom surface of the object, and thus may be disposed in a direction corresponding to a lengthwise direction of the second accommodation part 120 of the battery case 100.

After the second pressing frame 1224 presses the second rotation block 1154 of the second docking unit 1100*b* so that the second rotation block 1154 rotates, when the first pressing frame 1222 presses the first rotation block 1152 while in contact with the first rotation block 1152 of the first docking unit 1100*a*, the first leg 1110 of the first docking unit 1100*a* may be folded.

A process of folding the first docking unit 1100*a* by starting the rotation of the first rotation block 1152 by the first pressing frame 1222 is the same as the above-described process of folding the second docking unit 1100*b*, and thus a description thereof will be omitted.

In this way, when the docking button 2210 of the handle assembly 2000 pushes the push block 1200 of the docking assembly 1000, a structure in which the second leg 1120 is folded and the first leg 1110 is then folded means that the second docking unit 1100*b*, which first enters an interior of the vehicle, is first folded and the first docking unit 1100*a* is folded. Thus, the first docking unit 1100*a* is folded before the second docking unit 1100*b* is folded so that a time lag caused when the vehicle battery attachment/detachment device 1 moves into the vehicle can be prevented, and a time consumed for replacing a vehicle battery can be saved.

Further, when the first docking unit 1100*a* and the second docking unit 1100*b* are folded, the caster 1116 of the first docking unit 1100*a* and the caster 1116 of the second docking unit 1100*b* may be arranged on both sides of the second accommodation part 120 of the battery case 100. Thus, the battery case 100 may smoothly enter the interior of the vehicle through the caster 1116.

FIG. 6 is a cross-sectional view illustrating an initial state of a handle assembly, FIG. 7 is an enlarged view of part A of FIG. 6, FIG. 8 is a cross-sectional view illustrating a state in which a first lock block is moved by a first unlock button, FIG. 9 is an enlarged view of part B of FIG. 8, FIG. 10 is a cross-sectional view illustrating a state in which a first protrusion frame protrudes outward from a cover case, FIG. 11 is an enlarged view of part C of FIG. 10, FIG. 12 is a cross-sectional view illustrating a state in which a second protrusion frame protrudes outward from the first protrusion frame, FIG. 13 is an enlarged view of part D of FIG. 12, and FIG. 14 is an enlarged view of part E of FIG. 13.

Referring to FIGS. 1 to 14, the handle assembly 2000 may be configured to easily lead the battery case 100. The handle assembly 2000 may include a cover case 2100, a button unit 2200, and a handle unit 2300.

The cover case 2100 may be coupled to the battery case 100. In more detail, the cover case 2100 may cover an opening of the battery case 100, into which a battery is inserted. An accommodation groove or accommodation hole in which buttons of the button unit 2200 and frames of the handle unit 2300 are movably accommodated may be formed in the cover case 2100. Further, a gripping groove may be formed in the cover case 2100 so that a user can pull the cover case 2100.

The button unit 2200 may be coupled to the cover case 2100. The button unit 2200 may activate or restrict movement of the handle unit 2300. The button unit 2200 may include the docking button 2210, an unlock button 2220, and a first lock block 2230.

The docking button 2210 may be movably accommodated in the accommodation hole formed in the cover case 2100. The docking button 2210 may be connected to the movement frame 1210 of the push block 1200 of the docking assembly 1000. The docking button 2210 may press the movement frame 1210 of the push block 1200. When the docking button 2210 is moved to press the movement frame 1210 of the push block 1200, the first docking unit 1100*a* and the second docking unit 1100*b* of the docking assembly 1000 may be folded.

As illustrated in FIGS. 1, 6, and 8, the unlock button 2220 may be disposed in one region of the cover case 2100 constituting a gripping groove. The unlock button 2220 may move in a movement direction of the handle unit 2300. On the basis of FIGS. 6 and 8, the unlock button 2220 may move toward an upper side or a lower side of the cover case 2100. The unlock button 2220 may be connected to the first lock block 2230 to control movement of the first lock block 2230.

The unlock button 2220 may be configured as a combination of a body portion having a rectangular edge and a wedge-shaped inclined portion protruding from the body portion. The inclined portion may have an inclined surface inclined downward in a direction from a center point toward a side point. The inclined surface may press the first lock block 2230 while in contact with the first lock block 2230.

As illustrated in FIG. 6, the first lock block 2230 may be disposed below the unlock button 2220. The first lock block 2230 may be connected to the unlock button 2220 to move in conjunction with the movement of the unlock button 2220. Thus, the first lock block 2230 may move to a left side or right side of the cover case 2100 on the basis of FIG. 6 by the movement of the unlock button 2220.

The first lock block 2230 may include a body portion moved by a pressing force transmitted from the inclined surface of the inclined portion and a hook portion disposed at an end of the body portion to hold or release movement of some components of the handle unit 2300.

The handle unit 2300 may be disposed on the cover case 2100 to be movable inside and outside the cover case 2100. The handle unit 2300 may be of a telescopic type that may be stretched in a direction different from the movement direction of the battery case 100.

The handle unit 2300 may include a pressing button 2310, a grip frame 2320, a rod 2330, a first transport frame 2340, a second transport frame 2350, a first protrusion frame 2360, a second protrusion frame 2370, a pin block 2380, a second lock block 2390, a first housing 2396, and a second housing 2398.

The pressing button 2310 may be disposed outside the battery case 100. The pressing button 2310 may be disposed inside the grip frame 2320. The pressing button 2310 may be exposed through a hole formed in the grip frame 2320. The pressing button 2310 may move in the same direction as that of the unlock button 2220. The pressing button 2310 may include a pressing portion pressed by a user and a contact portion connected to the pressing portion and in contact with the rod 2330.

The grip frame 2320 may be disposed outside the battery case 100. The grip frame 2320 may be supported by the battery case 100. The grip frame 2320 may accommodate the pressing button 2310 therein. The grip frame 2320 may have rounded corners so that a user may grip the grip frame 2320.

The rod 2330 may be disposed inside the grip frame 2320 and the second protrusion frame 2370. One end of the rod 2330 may be connected to the contact portion of the pressing button 2310, and the other end thereof may be connected to a first pin block 2382, which will be described below. The rod 2330 may be pressed by the pressing button 2310 and move in the same direction as a direction in which the pressing button 2310 presses. The rod 2330 may be pressed by the pressing button 2310 to move the first pin block 2382.

The first transport frame 2340 may be connected to the first lock block 2230 of the button unit 2200. The first transport frame 2340 may move in a direction different from the movement direction of the first lock block 2230 inside the cover case 2100 by the movement of the first lock block 2230.

The first transport frame 2340 may include at least one position fixing hole connected to the first lock block 2230 while moving in a direction different from the movement direction of the first lock block 2230. The position fixing hole may include a $(1\text{-}1)^{th}$ position fixing hole 2342 and a $(1\text{-}2)^{th}$ position fixing hole 2344. The $(1\text{-}1)^{th}$ position fixing hole 2342 and the $(1\text{-}2)^{th}$ position fixing hole 2344 may be spaced apart from each other in a lengthwise direction of the first transport frame 2340. The $(1\text{-}1)^{th}$ position fixing hole 2342 and the $(1\text{-}2)^{th}$ position fixing hole 2344 may be arranged on the same surface in the first transport frame 2340. When the hook portion of the first lock block 2230 is disposed in at least one of the $(1\text{-}1)^{th}$ position fixing hole 2342 and the $(1\text{-}2)^{th}$ position fixing hole 2344, the movement of the first transport frame 2340 may be restricted. Thus, a position of the first transport frame 2340 may be fixed.

The second transport frame 2350 may be coupled to the first transport frame 2340 through a fixing member such as a bolt. The second transport frame 2350 may be disposed inside the first transport frame 2340. The second transport frame 2350 may have a length that is greater than that of the first transport frame 2340. Thus, the second transport frame 2350 may protrude outward from the first transport frame 2340. Further, the second transport frame 2350 may protrude outward from the cover case 2100 while protruding outward from the first transport frame 2340.

The second transport frame 2350 may include a (2-1)$^{th}$ position fixing hole 2352 and a (2-2)$^{th}$ position fixing hole 2354. The (2-1)$^{th}$i position fixing hole 2352 and the (2-2)$^{th}$ position fixing hole 2354 may be arranged on the different surfaces in the second transport frame 2350. The (2-1)$^{th}$ position fixing hole 2352 and the (2-2)$^{th}$ position fixing hole 2354 may be spaced apart from each other in a lengthwise direction of the second transport frame 2350. In the present embodiment, it is illustrated that the (2-1)$^{th}$ position fixing hole 2352 is disposed below the (2-2)$^{th}$ position fixing hole 2354. However, the present disclosure is not limited thereto. A hook portion of a (2-1)$^{th}$ lock block 2392, which will be described below, may be disposed in the (2-1)$^{th}$ position fixing hole 2352. A hook portion of a (2-2)$^{th}$ lock block 2394, which will be described below, may be disposed in the (2-2)$^{th}$ position fixing hole 2354.

The first protrusion frame 2360 may be movably disposed inside the second transport frame 2350. One end of the first protrusion frame 2360 may protrude outward from the cover case 2100. The first protrusion frame 2360 may be coupled to the second housing 2398, which will be described below, and may move in conjunction with movement of the second housing 2398. A position of the first protrusion frame 2360 may be fixed by the (2-2)$^{th}$ lock block 2394, which will be described below.

The first protrusion frame 2360 may include a (3-1)$^{th}$ position fixing hole 2362 and a (3-2)$^{th}$ position fixing hole 2364. The (3-1)$^{th}$ position fixing hole 2362 and the (3-2)$^{th}$ position fixing hole 2364 may be spaced apart from each other in a lengthwise direction of the first protrusion frame 2360. The (3-1)$^{th}$ position fixing hole 2362 and the (3-2)$^{th}$ position fixing hole 2364 may be arranged on the same surface in the first protrusion frame 2360. The hook portion of the (2-1)$^{th}$ lock block 2392, which will be described below, may be disposed in at least one of the (3-1)$^{th}$ position fixing hole 2362 and the (3-2)$^{th}$ position fixing hole 2364.

The second protrusion frame 2370 may be movably disposed inside the first protrusion frame 2360. One end of the second protrusion frame 2370 may protrude outward from the cover case 2100. The second protrusion frame 2370 may be coupled to the first housing 2396, which will be described below, and may move in conjunction with movement of the first housing 2396. A position of the second protrusion frame 2370 may be fixed by the (2-1)$^{th}$ lock block 2392, which will be described below.

The second protrusion frame 2370 may support the grip frame 2320. Thus, when the second protrusion frame 2370 is raised, the grip frame 2320 may be raised, and when the second protrusion frame 2370 is lowered, the grip frame 2320 may be lowered.

The pin block 2380 may be connected to the rod 2330. The pin block 2380 may be connected to the rod 2330 and pressed by the rod 2330 and may be connected to the second lock block 2390 to move the second lock block 2390 by a pressing force generated in the rod 2330.

The pin block 2380 may include a first pin block 2382 and a second pin block 2384.

The first pin block 2382 may be movably disposed inside the first housing 2396. The first pin block 2382 may protrude from an inside to an outside of the first housing 2396. The first pin block 2382 may be configured as a combination of a head in contact with the rod 2330 and a pressing portion protruding from the head and movably disposed inside the first housing 2396. An end of the pressing portion may have a shape corresponding to an inclined portion of the (2-1)$^{th}$ lock block 2392, which will be described below. Thus, the end of the pressing portion may be parallel to the inclined portion of the (2-1)$^{th}$ lock block 2392.

The second pin block 2384 may be movably disposed inside the second housing 2398. The second pin block 2384 may protrude from an inside to an outside of the second housing 2398. The second pin block 2384 may be configured as a combination of a head in contact with the rod 2330 and a pressing portion protruding from the head and movably disposed inside the second housing 2398.

An end of the pressing portion may have a shape corresponding to an inclined portion of the (2-2)$^{th}$ lock block 2394, which will be described below. Thus, the end of the pressing portion may be parallel to the inclined portion of the (2-2)$^{th}$ lock block 2394.

The second lock block 2390 may be disposed inside the second protrusion frame 2370. The second lock block 2390 may pass through the second transport frame 2350 and the first protrusion frame 2360 to restrict movement of the second transport frame 2350 and the first protrusion frame 2360. The second lock block 2390 may include a (2-1)$^{th}$ lock block 2392 and a (2-2)$^{th}$ lock block 2394.

The (2-1)$^{th}$ lock block 2392 may be movably disposed inside the first housing 2396. The (2-1)$^{th}$ lock block 2392 may include an inclined portion disposed in parallel to the pressing portion of the first pin block 2382 and a hook portion moved in conjunction with movement of the inclined portion. When the first housing 2396 is moved, the hook portion may be arranged in the (2-1)$^{th}$ position fixing hole 2352, the (3-1)$^{th}$ position fixing hole 2362, and the (3-2)$^{th}$ position fixing hole 2364.

The (2-2)$^{th}$ lock block 2394 may be movably disposed inside the second housing 2398. The (2-2)$^{th}$ lock block 2394 may include an inclined portion disposed in parallel to the pressing portion of the second pin block 2384 and a hook portion moved in conjunction with movement of the inclined portion. When the second housing 2398 is moved, the hook portion may be disposed on the (2-2)$^{th}$ position fixing hole 2354.

The first housing 2396 may be supported by the first pin block 2382. The first housing 2396 may be coupled to the second protrusion frame 2370 and support the second protrusion frame 2370. The first pin block 2382 and the (2-1)$^{th}$ lock block 2392 may be movably arranged inside the first housing 2396. The first housing 2396 may be coupled to the (2-1)$^{th}$ lock block 2392 and may move in the same direction as a direction in which the (2-1)$^{th}$ lock block 2392 moves.

The second housing 2398 may be supported by the second pin block 2384. The second housing 2398 may be coupled to the first protrusion frame 2360 and support the first protrusion frame 2360. The second pin block 2384 and the (2-2)$^{th}$ lock block 2394 may be movably arranged inside the second housing 2398. The second housing 2398 may be coupled to the (2-2)$^{th}$ lock block 2394 and move in the same direction as a direction in which the (2-2)$^{th}$ lock block 2394 moves.

Hereinafter, a process of operating the handle unit 2300 will be described.

Referring to FIGS. 6 to 14, in an initial state in which the unlock button 2220 of the button unit 2200 is not pressed by a user, the inclined surface of the inclined portion of the unlock button 2220 is merely in contact with the inclined surface of the inclined portion of the first lock block 2230, and the unlock button 2220 does not press the first lock block 2230. Further, in the initial state, the hook portion of the first lock block 2230 is disposed in the (1-1)$^{th}$ position fixing hole 2342, and thus the movement of the first transport frame 2340 is restricted.

Further, as illustrated in FIG. 7, in the initial state, the rod 2330 is maintained in a state in which the rod 2330 is not pressed by the pressing force transmitted through the pressing button 2310. Thus, a state in which the first pin block 2382 does not press the (2-1)$^{th}$ lock block 2392 while in contact with the (2-1)$^{th}$ lock block 2392 is maintained, and a state in which the first lock block 2230 is disposed in the (2-1)$^{th}$ position fixing hole 2352 and the (3-1)$^{th}$ position fixing hole 2362 is maintained.

Further, in the initial state, since the first housing 2396 does not press the second pin block 2384, a state in which the second pin block 2384 does not press the (2-2)$^{th}$ lock block 2394 while in contact with the (2-2)$^{th}$ lock block 2394 is maintained. Thus, a state in which the hook portion of the (2-2)$^{th}$ lock block 2394 is in contact with the second transport frame 2350 inside the second housing 2398 is maintained.

As illustrated in FIGS. 8 and 9, in this state, when a user presses the unlock button 2220, the inclined surface of the inclined portion of the unlock button 2220 presses the inclined surface of the inclined portion of the first lock block 2230. Accordingly, the hook portion of the first lock block 2230 moves away from the (1-1)$^{th}$ position fixing hole 2342 and moves in a direction from a side region to a central region of the unlock button 2220. Thus, on the basis of FIG. 8, the first transport frame 2340 is in a state in which the first transport frame 2340 may move in the lengthwise direction of the first transport frame 2340.

In this way, in a state in which the first transport frame 2340 may move, when a user grips the grip frame 2320 and raises the grip frame 2320 in the lengthwise direction of the first transport frame 2340, the first transport frame 2340 may move in the same direction as the movement direction of the grip frame 2320 on the basis of FIG. 8. Accordingly, components arranged inside the first transport frame 2340 move in the same direction as a direction in which the first transport frame 2340 moves.

Here, the first transport frame 2340 may be moved by a distance from a center of the (1-1)$^{th}$ position fixing hole 2342 to a center of the (1-2)$^{th}$ position fixing hole 2344. This is because the first lock block 2230 is moved from the central region toward the side region of the unlock button 2220 by a restoring force of a spring connected to the first lock block 2230 and thus the hook portion of the first lock block 2230 is disposed in the (1-2)$^{th}$ position fixing hole 2344 when the first transport frame 2340 is moved so that the hook portion of the first lock block 2230 is changed from a state in which the hook portion faces the (1-1)$^{th}$ position fixing hole 2342 to a state in which the hook portion faces the (1-2)$^{th}$ position fixing hole 2344.

Accordingly, as illustrated in FIG. 9, the hook portion of the first lock block 2230 is disposed in the (1-2)$^{th}$ position fixing hole 2344, and thus the first transport frame 2340 may be fixed to the first lock block 2230. Thus, the handle unit 2300 is in a first position fixed state in which the movement of the first transport frame 2340 is stopped and the movement of the first transport frame 2340 is restricted again.

In a state in which the movement of the first transport frame 2340 is restricted by the first lock block 2230, when a user presses the pressing button 2310 in a direction from the first pin block 2382 to the second pin block 2384, the rod 2330 moves together with the pressing button 2310. The rod 2330 moving together with the pressing button 2310 presses the first pin block 2382 so that the first pin block 2382 moves together with the rod 2330. Accordingly, the pressing portion of the first pin block 2382 presses the inclined portion of the (2-1)$^{th}$ lock block 2392, and thus the hook portion of the (2-1)$^{th}$ lock block 2392 escapes from the (2-1)$^{th}$ position fixing hole 2352 and the (3-1)$^{th}$ position fixing hole 2362 and comes into contact with an inner surface of the first protrusion frame 2360.

In this way, when a user raises the grip frame 2320 in a state in which the hook portion of the (2-1)$^{th}$ lock block 2392 is in contact with the inner surface of the first protrusion frame 2360, the rod 2330, the second protrusion frame 2370, the first pin block 2382, the (2-1)$^{th}$ lock block 2392, and the first housing 2396 move along the grip frame 2320.

The rod 2330, the second protrusion frame 2370, the first pin block 2382, the (2-1)$^{th}$ lock block 2392, and the first housing 2396 moving in the same direction as the movement direction of the grip frame 2320 may protrude outward from the first transport frame 2340. Here, as illustrated in FIG. 11, the hook portion of the (2-1)$^{th}$ lock block 2392 protruding outward from the first transport frame 2340 may be disposed in the (3-2)$^{th}$ position fixing hole 2364 of the first protrusion frame 2360 while in contact with the inner surface of the first protrusion frame 2360 by the restoring force of the spring.

Thus, the handle unit 2300 is in a second position fixed state in which the positions of the pressing button 2310, the grip frame 2320, the rod 2330, the first pin block 2382, the (2-1)$^{th}$ lock block 2392, the first housing 2396, and the second protrusion frame 2370 are fixed.

In a state in which the positions of the pressing button 2310, the grip frame 2320, the rod 2330, the first pin block 2382, the (2-1)$^{th}$ lock block 2392, the first housing 2396, and the second protrusion frame 2370 are fixed, when a user raises the grip frame 2320 again, the rod 2330, the second protrusion frame 2370, the first pin block 2382, the (2-1)$^{th}$ lock block 2392, and the first housing 2396 move along the grip frame 2320 in the same direction as the movement direction of the grip frame 2320.

In this case, since the (2-1)$^{th}$ lock block 2392 is disposed in the (3-2)$^{th}$ position fixing hole 2364 of the first protrusion frame 2360, the first protrusion frame 2360 moves along the (2-1)$^{th}$ lock block 2392. Accordingly, the second housing 2398 connected to the first protrusion frame 2360 moves along the first protrusion frame 2360, and the second pin block 2384 and the (2-2)$^{th}$ lock block 2394 move together with the second housing 2398. Here, the hook portion of the (2-2)$^{th}$ lock block 2394 is in contact with an inner surface of the second transport frame 2350.

In this way, the first protrusion frame 2360, the second pin block 2384, the (2-2)$^{th}$ lock block 2394, and the second housing 2398 moving along the (2-1)$^{th}$ lock block 2392 may be arranged at positions protruding outward from the first transport frame 2340. In particular, while the (2-2)$^{th}$ lock block 2394 moves, the hook portion of the (2-2)$^{th}$ lock block 2394 may be disposed at the (2-2)$^{th}$ position fixing hole 2354 of the second transport frame 2350.

Thus, as illustrated in FIG. 12, the handle unit 2300 is in a third position fixed state in which the positions of the first protrusion frame 2360, the second pin block 2384, the (2-2)$^{th}$ lock block 2394, and the second housing 2398 are fixed.

In this way, in the vehicle battery attachment/detachment device 1 according to an embodiment of the present disclosure, a user can easily carry the battery case 100 despite different body structures through the handle unit 2300 of which a height changes according to the position fixed states. Thus, entry of the battery case 100 into the vehicle can be improved, and unnecessary waste of the user's power is reduced so that the user's convenience can be improved.

In the vehicle battery attachment/detachment device according to an embodiment of the present disclosure, the battery case 100 may be installed even outside the vehicle through the docking unit 1100. Thus, in a state in which the battery case 100 is disposed outside the vehicle, a battery accommodated inside the battery case 100 can be directly connected to the vehicle or various home appliances through wires such as electric wires. In this case, a hole through which a wire connected to the battery can be withdrawn to the outside of the battery case 100 may be provided at an end of the battery case 100, in which the cover case 2100 is not disposed in the lengthwise direction of the battery case 100.

According to an embodiment of the present disclosure, since a plurality of leg units are automatically folded in a lengthwise direction of a battery case through a docking button, time can be saved as compared to a case in which a user manually folds the leg units.

Further, according to an embodiment of the present disclosure, since the plurality of leg units are spaced apart from each other in the lengthwise direction of the battery case, the battery case can move in a state in which the battery case is stably maintained in a horizontal state without a leveling guide.

Although the embodiments of the present disclosure have been described above, those skilled in the art may understand that the present disclosure may be variously modified and changed without departing from the spirit and scope of the present disclosure described in the appended claims. Further, differences related to these changes and modifications should be construed as being included in the scope of the present disclosure defined in the appended claims.

What is claimed is:

1. A vehicle battery attachment/detachment device comprising:

a battery case that accommodates a battery therein and moves into a vehicle in a width direction of the vehicle;

a docking assembly that is rotatably coupled to the battery case and is folded to move into the vehicle together with the battery case or is unfolded to move the battery case to an outside of the vehicle; and a handle assembly coupled to the battery case, wherein the handle assembly includes a docking button that is connected to the docking assembly and pushes the docking assembly so that the docking assembly rotates, and the docking assembly includes:

docking units arranged on both sides of the battery case; and a push block that is connected to the docking button and pushes the docking units so that the docking units rotate in conjunction with movement of the docking button.

2. The vehicle battery attachment/detachment device of claim 1, wherein the docking units include a first docking unit disposed at an end of the battery case, which is coupled to the handle assembly, in a lengthwise direction of the battery case; and a second docking unit disposed at an end of the battery case, which is not coupled to the handle assembly, and when the docking button of the handle assembly pushes the push block of the docking assembly, a first leg is folded after a second leg is folded.

3. The vehicle battery attachment/detachment device of claim 2, wherein the docking units include:

first legs arranged on both sides of the battery case;

second legs arranged on the both sides of the battery case, each of the second legs arranged inclined with respect to each of the first leg to overlap one region of the each of the first legs;

a first connector rotatably coupled to the battery case, protruding from an inside to an outside of the battery case, and coupled to at least one of the first legs;

a second connector rotatably coupled to the battery case, protruding from the inside to the outside of the battery case, and coupled to at least one of the second legs; and a rotation block connected to the second connector and pressed and rotated by the push block of the handle assembly.

4. The vehicle battery attachment/detachment device of claim 3, wherein the rotation block includes:

a first rotation block coupled to the second connector of the first docking unit; and a second rotation block coupled to the second connector of the second docking unit.

5. The vehicle battery attachment/detachment device of claim 4, wherein the push block of the docking assembly includes:

a movement frame connected to the docking button of the handle assembly and having a space formed therein; and a pressing frame that is disposed inside the movement frame and rotates the first rotation block and the second rotation block.

6. The vehicle battery attachment/detachment device of claim 5, wherein the pressing frame includes:

a first pressing frame that presses the first rotation block; and a second pressing frame that presses the second rotation block.

7. The vehicle battery attachment/detachment device of claim 6, wherein, in a state before the docking button of the handle assembly presses the movement frame of the push block, the first pressing frame is maintained in a state spaced apart from the first rotation block, and the second pressing frame is maintained in a state in contact with the second rotation block.

8. The vehicle battery attachment/detachment device of claim 6, wherein when the docking button of the handle assembly presses the movement frame of the push block, after the second rotation block starts to rotate by the second pressing frame, the first pressing frame comes into contact with the first rotation block.

9. The vehicle battery attachment/detachment device of claim 1, wherein the handle assembly includes:

a cover case that is coupled to the battery case and covers an opening of the battery case;

a handle unit that is disposed on the cover case to be movable inside and outside the cover case and is of a telescopic type that is stretched in a direction different from a movement direction of the battery case; and a button unit that is coupled to the cover case and activates or restricts movement of the handle unit.

10. The vehicle battery attachment/detachment device of claim 9, wherein the button unit includes:

an unlock button that is movable in the movement direction of the handle unit; and a first lock block connected to the unlock button to move in conjunction with the movement of the unlock button.

11. The vehicle battery attachment/detachment device of claim 10, wherein the handle unit includes a first transport frame that is connected to the first lock block of the button unit and is movable in a direction different from the movement direction of the first lock block inside the cover case by the movement of the first lock block, and the first transport frame includes at least one position fixing hole connected to the first lock block while moving in a direction different from the movement direction of the first lock block.

12. The vehicle battery attachment/detachment device of claim 11, wherein the handle unit includes:

a pressing button that is disposed outside the battery case and is movable in a same direction as the unlock button; and a rod that is connected to the pressing button, is pressed by the pressing button, and is movable in the same direction as a direction in which the pressing button presses.

13. The vehicle battery attachment/detachment device of claim 12, wherein the handle unit includes:

a second transport frame that is coupled to the first transport frame and protrudes outward from the cover case;

a first protrusion frame movably disposed inside the second transport frame;

a second protrusion frame movably disposed inside the first protrusion frame; and a second lock block passing through the second transport frame and the first protrusion frame to restrict movement of the second transport frame and the first protrusion frame.

14. The vehicle battery attachment/detachment device of claim 13, wherein the handle unit includes a pin block connected to the rod and pressed by the rod and connected to the second lock block to move the second lock block by a pressing force generated in the rod.

\* \* \* \* \*